United States Patent [19]
Ratner et al.

[11] Patent Number: 5,889,957
[45] Date of Patent: Mar. 30, 1999

[54] METHOD AND APPARATUS FOR CONTEXT SENSITIVE PATHSEND

[75] Inventors: Mitchell Ratner, Los Gatos; Michael R. Blevins, Felton; David J. Schorow, San Jose, all of Calif.; Rodney T. Limprecht, Redmond, Wash.

[73] Assignee: Tandem Computers Incorporated, Cupertino, Calif.

[21] Appl. No.: 472,227

[22] Filed: Jun. 7, 1995

[51] Int. Cl.[6] ............................................. G06F 13/00
[52] U.S. Cl. ............................ 395/200.57; 395/200.33
[58] Field of Search ............................ 395/200, 876, 395/680, 650, 340, 200.33, 200.57

[56] References Cited

U.S. PATENT DOCUMENTS

| | | | |
|---|---|---|---|
| 5,249,293 | 9/1993 | Schreiber et al. | 395/200.33 |
| 5,546,583 | 8/1996 | Shriver | 395/650 |
| 5,577,172 | 11/1996 | Vatland et al. | 395/114 |
| 5,590,266 | 12/1996 | Carson et al. | 395/340 |
| 5,606,719 | 2/1997 | Nichols et al. | 395/876 |
| 5,617,540 | 4/1997 | Civanlar et al. | 395/200.57 |
| 5,617,570 | 4/1997 | Russell et al. | 395/684 |
| 5,619,697 | 4/1997 | Nishida | 395/680 |
| 5,634,127 | 5/1997 | Cloud et al. | 395/680 |
| 5,649,103 | 7/1997 | Datta et al. | 395/200.33 |

*Primary Examiner*—Christopher B. Shin
*Attorney, Agent, or Firm*—Graham & James LLP

[57] ABSTRACT

An improved method and apparatus for creating a context-sensitive pathsend in a asynchronous data packet network of the kind used typically in on-line transaction processing where a particular receiving server in a server pool must communicate with a particular originating client. By piggy-backing messages and employing run-time binding to create a logical connection between the server and client, the present invention achieves a dramatic improvement in processing data packets and minimizing system resources. In a preferred embodiment the invention is backwardly compatible with existing context-free applications.

19 Claims, 4 Drawing Sheets

Microfiche Appendix Included
(3 Microfiche, 158 Pages)

000
METHOD AND APPARATUS FOR CONTEXT SENSITIVE PATHSEND

CROSS REFERENCE TO MICROFICHE APPENDIX

This patent application incorporates sixty-one (61) frames of a microfiche appendix entitled "APPENDIX A" and referred to hereafter as Appendix A.

This patent application incorporates fifty-one (51) frames of a microfiche appendix entitled "APPENDIX B" and referred to hereafter as Appendix B.

This patent application incorporates forty-six (46) frames of a microfiche appendix entitled "APPENDIX C" and referred to hereafter as Appendix C.

BACKGROUND OF THE INVENTION

In a typical on-line transaction between a plurality of clients and one or more servers in a server pool, the client applications may send a voluminous number of very brief messages or requests (often tens of thousands of data packets each less than 32 k in size) that have to be processed by a particular server in the server pool. The clients and servers work independently (asynchronously) of one another, and the transmission of data by the network connecting client and server is asynchronous as well, as the data packets are sent in a message forwarding scheme. It would be advantageous in such an I/O asynchronous world if a collection of messages could be given "context" so that a specific server could service the collection of messages in as expeditious manner as possible, without having to resort to costly and time-consuming look-up and queuing processes every time a message was received, as in the prior art. One attempt to solve this problem is to provide the messages, server and client applications with information to establish a sort of temporary dedicated connection between server and client. The present invention is directed towards such a "context-sensitive dialog."

Other programs have attempted to provide for context sensitive dialogs ("pathsends"), such as Tuxedo, Encino, and CPIC (the protocol for some of these programs can be found in publications by the XOpen standard committee), but the present invention provides for a novel and improved dialog that has numerous advantages over any prior efforts.

MICROFICHE APPENDIX

Attached hereto in accordance with 37 CFR 1.96(b) are paper copies of low-level specifications of one embodiment of the present invention which will not be printed. Applicants will convert the paper copies of this appendix into proper microfiche form upon issuance of a Notice of Allowance.

SUMMARY OF THE INVENTION

One object of the present invention allows for a receiving process to optimize performance relating to processing of individual, yet logically related requests, by preventing the need for the receiving process to reinstate prior context so that the receiving process may process the current request.

Another object of the present invention is to provide greater functionality and ease of use to applications which need to perform multiple I/O which are logically related.

Another object of the invention is to enable the ability to solve problems where the solution requires one to logically send messages of sizes greater than 32 k bytes without having to reestablish context with every message sent.

A further object is to provide for transactional context to be carried on each logically related I/O.

Yet another object is to provide a mechanism which allows for a decrease in processing time for individual requests within a dialogue (session) by inventing the ability of the runtime to bind the originating process to the receiving process for the duration of the dialogue. This insures that all messages within the dialogue flow between the same originating and receiving process, and allows for the receiving process to maintain the context relating to the dialogue.

DETAILED DESCRIPTION OF THE PREFERRED EMBODIMENTS

In a typical on-line application of the present invention, an ATM machine may be connected to a "client" application (software program) and/or node. A node, or workstation, is hardware that operates off of software and consists of at least a processor, primary and secondary memory and I/O means, and typically includes several applications within it. In the most general case a single node may include and run both client and server applications within it.

A typical on-line application may require that the client application and/or network communicate with the host server application and/or node for a brief period of time (as short as a few seconds). There may be thousands of such client nodes for every server node, as well as a plurality of interconnected server nodes. Typically tens of thousands of messages are being passed between client and server at any given time.

A typical transaction between client and server is a debit/credit transaction, and such a transaction has its own unique problems. At the client node, a bank customer may be debiting his checking account with a cash withdrawal. The transaction between the client and server needs to be monitored so that in the event of an unexpected failure during communications between client and server, the transaction can be "rolled back" to the initial state prior to the failure, otherwise, either the customer or the bank would be unfairly credited or debited for a transaction that was never completed. Further, client applications run asynchronously from server applications, and during a typical session the client node application may be performing such tasks as outputting to a screen, printing a receipt or the like, while a server node application may be performing a database operation with the bank's databases. However, there may be instances where a particular server must be accessed by a particular client, and repeatedly accessed. Furthermore, there may be instances where one must get a number of outstanding checks from a checking account. The result may be larger than a message buffer can hold. By sending a second and subsequent message to the same server, we avoid the overhead of reestablishing the query. The present invention addresses these concerns as well, to utilize a minimum of system resources in as expeditious manner as possible.

A further aspect of the present invention is to provide for as little overhead as possible with establishing or breaking a connection (session) between client and server. The method of practicing the present invention utilizes this property to its fullest. Thus the cost of establishing or breaking down the connection (operating system resources, including memory, operating system time) is small.

Figure 1:
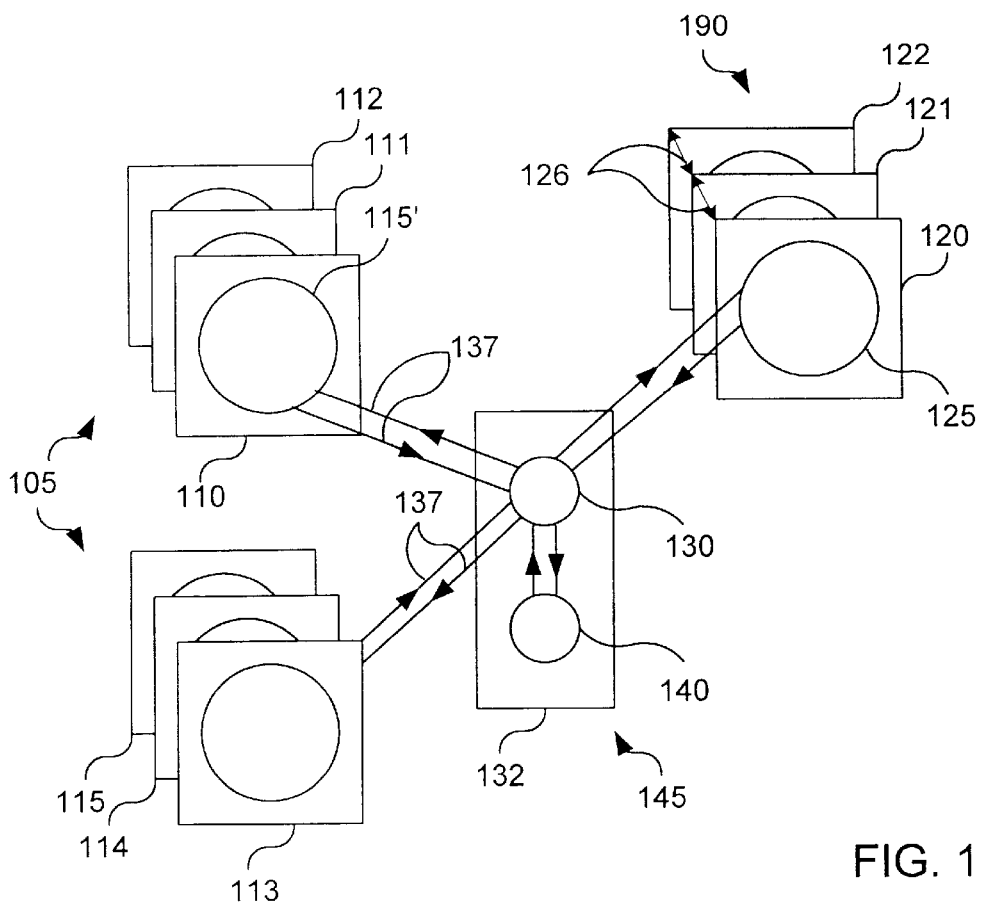
FIG. 1 discloses a typical multi-threaded network embodying the present invention.

Turning attention now to FIG. 1, there is shown at least one client node 110 (having at least one client or client program or application 115'), that needs to be connected to at least one server node 120 (having at least one server program or application 125) that executes some service, such as database operations. The communication between client and server applications is done through an operating system process application 130, called "Linkmon"(LM) in the present application, which may and typically does reside in a separate node 132 from the client and server nodes 110, 120. As always there are a plurality of client nodes communicating with every single server, such as client nodes 110–115, and in the general environment there are a plurality of server nodes 120–122, all communicating with one another, as indicated by communication lines 126. Messages are passed between nodes as indicated by the communication lines 137.

In a preferred embodiment of the invention the Linkmon application 130 itself communicates and calls upon the operating system application 140, which must be also be the operating system common to both the server application and client applications, and which is shown residing in node 132 in FIG. 1. In this preferred embodiment node 132 is in a Tandem computer and operating system 140 is running under the Guardian Tandem operating system (Non-Stop Kernel OS, B30.02 version).

The operating system application 140 residing in hardware 132 is also called a "process monitor", shown as node 145, and it optimizes the client-server-service relationship to perform the best way to connect servers to clients. In the Tandem environment this process monitor is called "Pathway", or TS/MP ("transaction services/ massively parallel"), since it allows for parallel servers to work on a problem in tandem. Typically TS/MP compatible servers lend themselves well to and are employed in on-line transaction processing (OLTP). In such TS/MP environments, increasing computing resources by a factor of N is roughly a serial function of N computers, in that adding N more computer nodes to the TS/MP network will increase the computer resources by N, since the computers for the most part work independently and in parallel.

As shown in FIG. 1, the present invention typically is run with "cascaded servers"120–122, where one server may delegate the server functions to another server at another location. Also as shown, typically a single server node services a plurality of client nodes. Furthermore, a particular server node may be assigned to a particular set of client nodes, so that not any server can service any client node. In the past when using non-context sensitive pathsends in a message between client and server applications, the server application would have to reestablish all states associated with the client. This problem is eliminated in the context sensitive pathsend of the present invention.

Complicating the client-server relationship in the Tandem environment is that there is a plurality of servers 120–122, or "pool" of servers 190 generally, that must service an even greater number of clients nodes (clients 105 generally) and their associated applications (with several applications per node possible). The idea behind the TS/MP node 145 is to multiplex the plurality of servers 190 for the plurality of clients 105 so that the transaction access time to make a connection is reasonably short. In some transactions, the client may only need access to a server for a few seconds. Thus, typically a queue of clients wishing to access servers is formed.

In the Tandem environment prior to the present invention there was only one general type of service session (dialogue or 'dialog') that could be asked for by a client: a context-free request session. In a context-free request, a service request is executed within the server but the server retains no context about that request. Thus the same client that called for a particular server with a similar subsequent request would likely obtain an entirely different server, with context only retained by the client application. The server would then have to reestablish all states associated with the clients to establish the correct relationships, in a time consuming manner. The present invention obviates this need. The present invention further supports a layering of different applications over the Tandem Pathway or TS/MP subsystem.

In a context sensitive session, for a plurality of sessions the client would after a first message in a dialog obtain the same server as the first message for all such subsequent messages in the dialog.

In the preferred embodiment of the implementation of the client/server context-sensitive pathsend, there is a particular API (Application Programming Interface) type call (appendices for the specifications of the API's are attached hereto, as explained below) called a "BEGIN DIALOG" that establishes a connection between client and server and simultaneously makes the first request (Send). A dialogue (session) can be broken by either a server or a client. Regarding the maintenance of a session by the server, a server acknowledges the message from the client after the transmission of a message from client node to server that establishes a connection, with an acknowledgement message passed back from the server to the client. As long as the server replies with a special error code, FeContinue, (ERROR CODE 70), the client will continue to be bound to the server and the request as well as the connection will be maintained. At this point the server and client are uniquely bound to one another and there is no need to check every subsequent message from the client to ascertain that it comes from the correct client.

If at any time the server replies with an error message other than the special error code (ERROR 70 or FeContinue), which is the code for "continue this session" (continue), a reply by the server is made to the client, but the connection is immediately thereafter broken between server and client. Thereafter, when the connection is broken, the next time the client establishes a connection it may well be with a different server. Error messages other than the special error code ERROR 70 (FeContinue or 'Continue') include error codes that request for normal termination, return codes such as FeOK (which stops a session) and error codes associated with abnormal events.

Regarding the maintenance of a session by a client node, the client may also, in response to a request from the server, terminate the session by sending back a "DIALOG ABORT" message. This immediately stops the session and guarantees an aborted dialogue. Aborted dialogue guarantees are important in certain ATM transactions, as noted above, in order to roll back transactions to leave parties in the same state they were prior to the initiation of the transactions (termed an "atomic transaction", in that the transaction is either completed or not). Aborted transactions can be distinguished from canceled transactions in that aborted transactions may occur due to unplanned events, but the distinction is not critical to this invention.

In addition to terminating the session by aborting, a client node can cancel a request, which alerts the client that the session is over. If any request is outstanding (queued) the request is canceled, and a message to this effect is sent back to the server. This is done by the DIALOG ABORT message.

The above system is integrated with Tandem's TM/MP subsystem (for transaction monitoring facility, a proprietary transaction log manager of Tandem), so that any abnormal termination of the dialogue will terminate the transaction. Abnormal termination may be arbitrarily defined to occur at any particular transaction demarcation boundary. A transaction demarcation boundary can be thought of as a point of no return in a transaction, before which a transaction may be rolled back but after which it cannot.

Figure 2:
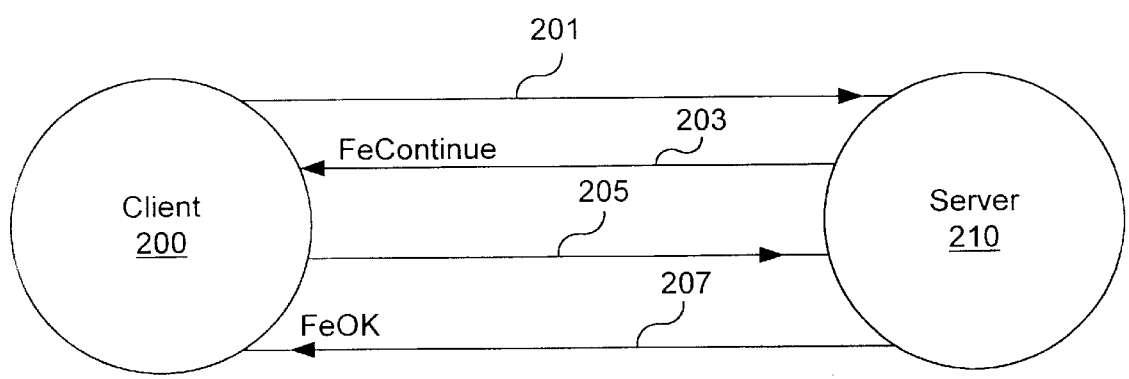
FIG. 2 discloses a typical ATM on-line debit/credit transaction utilizing the present invention.

Now consider a typical debit/credit transaction as illustrated in FIG. 2. Here a customer is transferring money from one account to the other, so one account is being debited (say a savings account) while another account (say a checking account) is being simultaneously credited in the same transaction. Typically a particular client node has to access a particular server node (which may be in a particular location, such as bank's regional headquarters) for such a debit/credit transaction. Of course intermediate the client and server nodes 200, 210 would be the TS/MP application (not shown) coordinating the process. As before, the first message 201 between client and server nodes 200 not only establishes or sets up a connection by identifying the particular client node involved in the transaction, but the message itself also can have information related to the transaction, such as, which account to debit, e.g., the savings account. The process of combining information related to establishing a connection with information related to the transaction that is the purpose behind the connection is known as "piggy-backing the setup onto the first send", and minimizes the setup time, especially when there are numerous such transaction messages.

An acknowledgement message (ref. no. 203) is returned by the server to the client (and includes an error code, here FeContinue to continue the dialogue). Thereafter another message (205) is sent by the client and received by the server, regarding the identification and crediting of a second account, e.g., the checking account. After this message is received, an acknowledgement message 207 simultaneously acknowledges that the message 205 has been received and, in the same message, instructs the client 200 to "tear down" (abort or cancel) the session (with its concomitant error code, FeOK).

By piggy-backing of messages there is economy in the number of messages sent, which is a tremendous advantage when dealing with many thousands of such dialogues. Often times, because only a few messages are sent in a typical debit/credit transaction (such as four in this example), piggy-backing of messages can nearly halve the total system operating cost of transmission.

Another aspect of the present invention is that in the event of a failure, either application at the client or server node will know where in the session the failure occurred and can "roll back" the session (if the failure occurred before a predetermined transaction demarcation boundary). Further, a series of segments of primary memory, called Dialog Control Blocks, also track the messages associated with particular clients.

Figure 3:
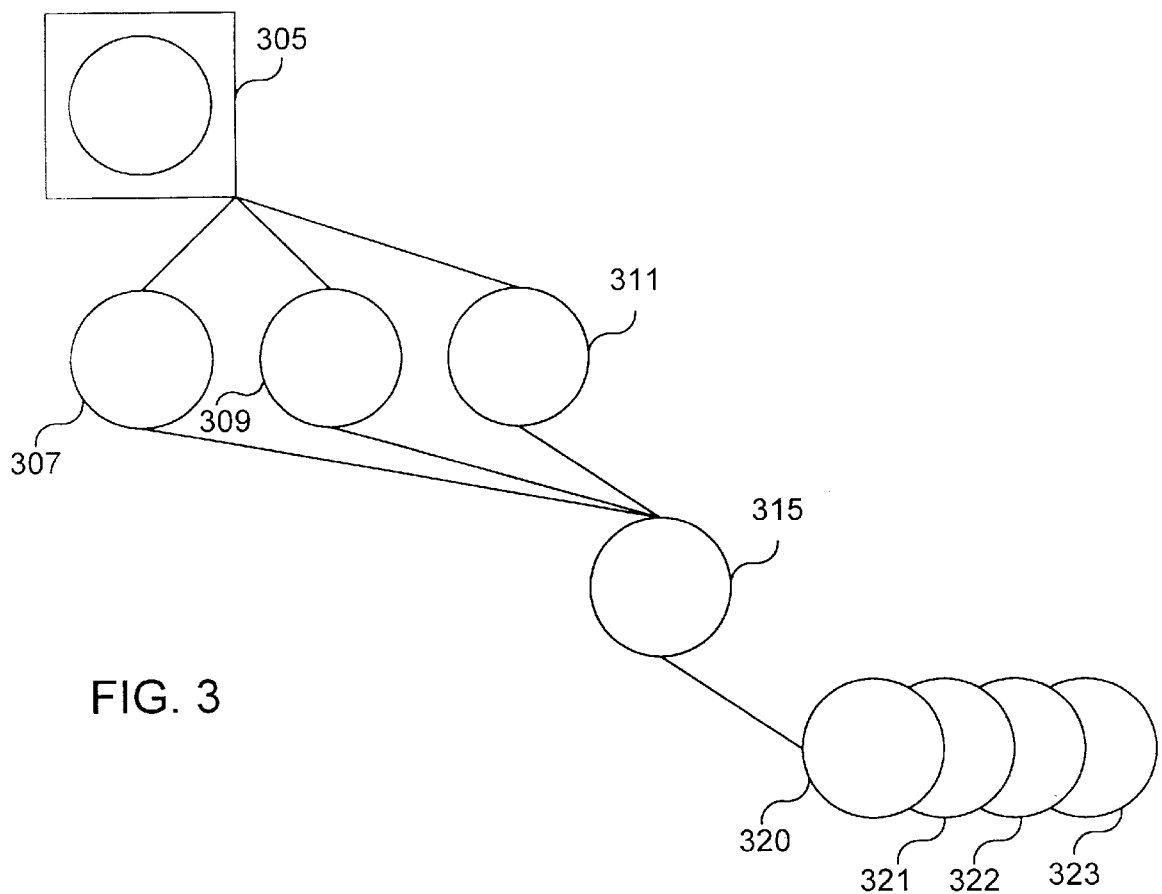
FIG. 3 discloses a typical multi-threaded network embodying the present invention.

Turning now to the preferred hardware and software implementation of the present invention, there is shown in FIG. 3 a client node 305 (workstation) having client applications (307, 309, 311), an operating system process application "Linkmon" 315, which is a proprietary Tandem process that is part of the "Pathway" TS/MP environment. Linkmon is in charge of all outbound resources of client node 305, including the client node cpu resources. Client node 305 and client applications 307, 309, 311 are connected with the Linkmon process through the IPC (Inter processor Communication) protocol. The Linkmon process itself is connected to the plurality of interconnected server nodes 320–323, and any applications therein (and their run-time libraries) through the IPC protocol as well. The Linkmon is what actually contains the "bindings"(linkages) between the client applications and the server. Linkmon in addition communicates with server applications which process the acknowledgement messages and other messages as disclosed herein. Linkmon considers all such messages from client applications and/or client cpu's, and cascades them to one or more server applications and/or server nodes or cpu's.

In the context-free case, Linkmon would forward a single request from a client to a server, await the reply, forward the reply back and always break context (terminate the session) at the end of every message. In the context-sensitive case of the present invention, Linkmon has to be responsible for maintaining the temporary binding between the client and server as well. In addition the method of the present invention uses the same routing mechanism (paths) for context-free requests as for context-sensitive requests, so that the method of the present invention is backwardly compatible with older Tandem applications not designed to be context-sensitive. Thus the preferred embodiment of the present invention uses the same API's for both context-free and context-sensitive dialogues, and only certain flags are present to indicate any differences in dialogues.

Another example (not illustrated) where a context-sensitive pathsend of the present invention would be an advantage is in the results of a SQL query where it was not clear whether the answer to a query would one row or a thousand rows. If the answer was a thousand rows, typically not all thousand rows could be sent at once due to memory constraints, and in a context-free query the connection to the sublanguage application that is processing the SQL would have to be established again and again. By establishing a context-sensitive pathsend, however, the cost of transferring the answers (rows) to such a query would be minimized, whether for one row or a thousand.

State diagrams for the preferred low-level implementation of the present invention are provided as attachments to this application as appendices. Appendices, A, B and C, entitled "IDS Internal Design Specification", "PRD Software Products Requirements" and "ES External Specification" respectively and incorporated by reference herein, are low-level implementation specifications for the internal design of the program of the present invention, the client applications that are context sensitive compliant with the present invention, and with the context sensitive servers, respectively. The present invention, however, is broader in scope than the particular preferred low level implementations disclosed in Appendices A, B and C.

DETAILED IMPLEMENTATION OF A
PREFERRED EMBODIMENT

In a preferred embodiment the following Application Programmatic Interfaces (APIs) have been invented to allow for the originating process to create a dialogue, to accomplish I/O on the dialogue, to carry transactional context on I/O within the dialogue, and to terminate the dialogue:

SERVERCLASS_DIALOG_BEGIN_
SERVERCLASS_DIALOG_SEND_
SERVERCLASS_DIALOG_ABORT_
SERVERCLASS_DIALOG_END_

The following API has been augmented to allow for dialogue information to be retrieved by the receiving process:

FILE_GETRECEIVEINFO_

Usage:

The originating process issues the SERVERCLASS_DIALOG_BEGIN_procedure call, targeting a specific type of receiving process.

The run-time environment will begin a receiving process and create a logical connection between the two cooperating processes (the originating process and the receiving process).

The receiving process will use the existing file mechanism known as READUPDATE to receive the incoming message, and then calls FILE_GETRECEIVEINFO to get additional information about the message just read. A new field has been invented to allow the receiving process to detect the context nature of the incoming request. After open receipt and detection of a SERVERCLASS_DIALOG_BEGIN_, the receiving process should reply with either FeOK or FeContinue return codes.

A return code of FeOK will cause the run-time environment to break the connection between the originating process and the receiving process, and the originating process, upon detecting the FeOK return code, will call SERVERCLASS_DIALOG_END_to clean up resources in the originating process's address space.

A return code of FeContinue will cause the run-time environment to maintain the connection between the originating process and the receiving process, so that subsequent SERVERCLASS_DIALOG_SEND_requests are routed to the same receiving process instance which is maintaining context relating to the dialogue.

The client may, at any time during the dialogue, issue a SERVERCLASS_DIALOG_ABORT_request which will generate a new Operating System message known as "DIALOG ABORT". The message will be sent to the receiving process so that the receiving process may clean up dialogue related resources. The operating system message is sent asynchronously, allowing for the originating process to continue to process in parallel with the receiving process's processing of the "DIALOG ABORT" message.

Also in the preferred embodiment the concept of a Dialog ID has been invented to allow for unique identification of the dialogue by the originating process, the run-time environment, and the receiving process (e.g., the state of the client-server relationship). As the Dialog ID is sent along with all messages on the Dialog, the receiving process keys on this, preventing the need for authentication of the originating process on all but the first I/O with the dialogue. Dialog IDs provide not only for authentication service, but are also used by the runtime environment for high performance access to pertinent data structures.

Figure 4:
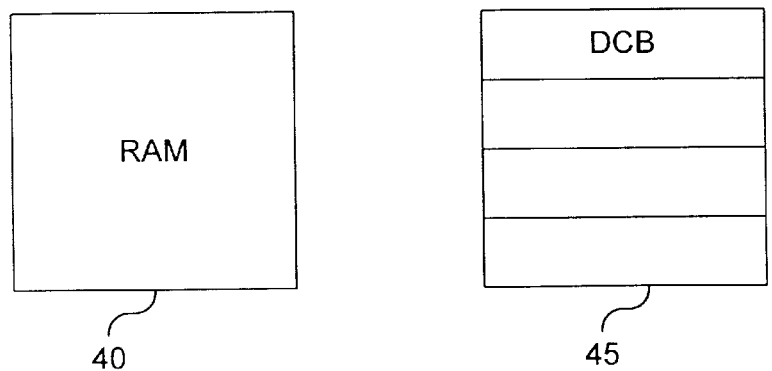
FIG. 4 discloses a schematic of primary memory segmented into blocks for the present invention.

Turning now to a low level description of the present invention, which is also disclosed in Appendix C, API's involved are "DIALOG BEGIN", "DIALOG SEND", "DIALOG ABORT", Cancel, Abort Transmission. The first three API's and Abort Transmission are for the TS/MP (Pathway) component of the present application, while cancel is for the file system, which is run by the Guardian OS. The code for these API's would reside in Tandem's system library. When the Linkmon application of the present invention is run by the Tandem Pathway subsystem, an associated segment in primary memory (RAM) of the node running the subsystem is set up that is accessed by the system library. FIG. 4 shows such a segment of memory, called the Dialog Segment, as ref. no. 45 as part of RAM 40, and compartmentalized into four pieces called Dialog Control Blocks (DCB). Every time the client application calls one of the API's of the TS/MP (Pathway) it will put the Dialog Control Blocks in a different state in every Dialog Segment and affect a change reflecting this state. There is one Dialog Segment per session. Thus for example if a call is made to DIALOG SEND, it will cause the initiation of a message from either the server application or the client application, which is done through a Tandem OS primitives formatting a buffer, such as Tandem's WriteRead OS primitive. A DIALOG BEGIN does a DIALOG SEND as well as the acknowledgment of a message that a session has been started, which prevents two conflicting sessions to be established for a single client application. An algorithm keeps track of the changes in the Dialog Segment (state information for each session) for each call to the APIs by the client application. The server application uses file system API's, such as READUPDATE, FILE_GETRECEIVEINFO and REPLY. Thus the state that a client application is preserved, so that in the event of an unexpected failure system resources can be cleaned up and restored and/or transactions rolled back.

In addition, mechanisms have also been invented to allow for outstanding I/O on the dialogue to be canceled as necessary.

Other modules can be checked for message completion. Dialog control blocks to check for states and used in conjunction with the APIs in networks are known per se and form only one possible low-level implementation of the present invention.

Figure 5:
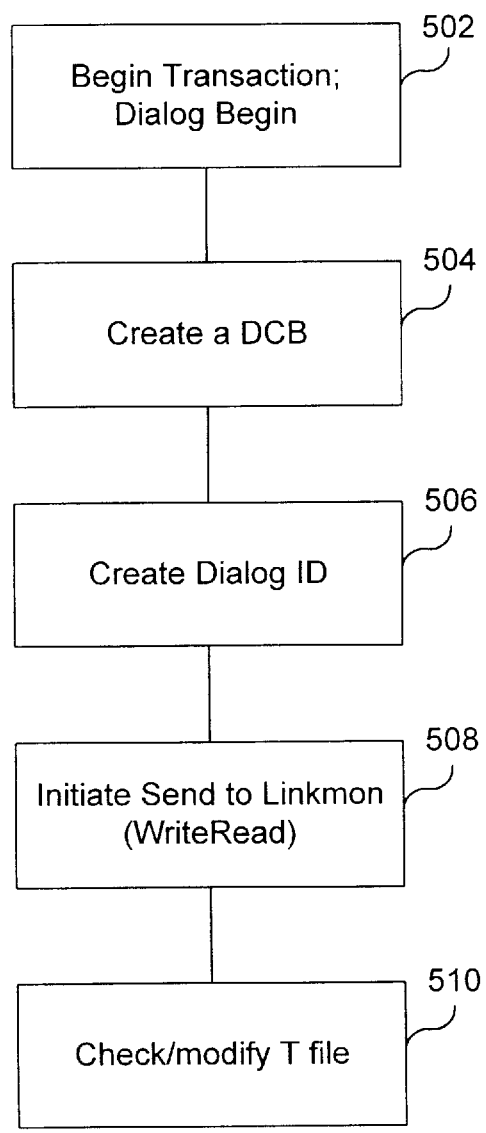
FIG. 5 discloses a flowchart for how a client application utilizes one aspect of one embodiment of the present invention.

Thus, by way of example, turning to FIG. 5, a client application via Linkmon calls the API "DIALOG BEGIN" first, which calls a "Begin Transaction" (Dialog Begin) routine (step 502), creates a Dialog Control Block (DCB) (step 504), creates a Dialog ID (step 506), initiates a Send to the Linkmon process using Tandem's WriteRead (step 508), and sets the state and state tables of the DCB to reflect that a DIALOG BEGIN has been initiated. A low level data structure ("T file") in the process file segment is then incremented that contains information related to opened transactions (step 510). Once the session is over, the low level data structure in step 510 is returned to its original state and memory resources are freed and restored.

Figure 6:
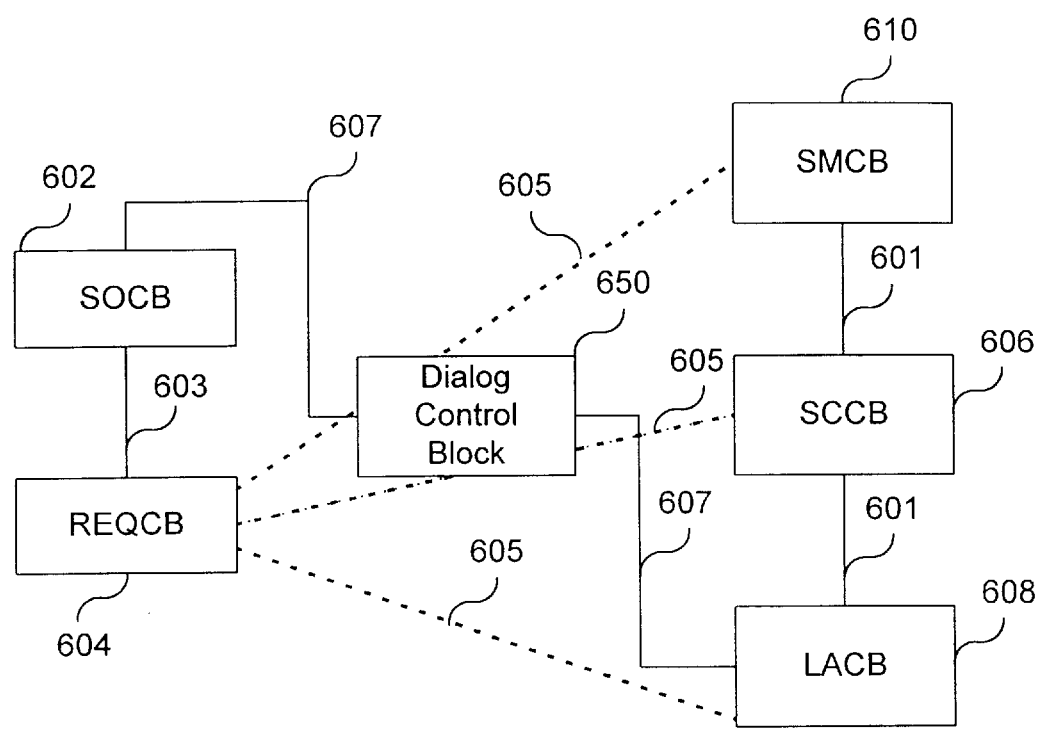
FIG. 6 discloses a block diagram for how objects embodying one aspect of the present invention are interrelated.

Turning now to FIG. 6, there is illustrated the object oriented representation of the dialogue between client and server for a preferred embodiment of the context-sensitive case. Objects relating to the steps outlined in FIG. 5 are created and managed in the "Linkmon" portion of the client application. These include: a "Send Open Control Block" (SOCB) object 602; and a "Request" data object control block, REQCB object 604, both constructed the first time a client attempts to communicate with a server via Linkmon. Regarding the server application, an object 606 called SCCB (Server Class Control Block) is created related to the server class (SC) (one such object per server class). A Link Access Control Block (LACB) 608 (representation of a server process open), uniquely identifies the access path to a server process. Finally, a server monitor control block (SMCB) 610 supervises the other server objects.

The control blocks 606, 608 and 610 create links (bindings) to one another (shown symbolically as links 601) when the server application is started. When client applications initiate contact to the server (via Linkmon) and DIALOG BEGIN is called (a DIALOG SEND is also piggy-backed to the DIALOG BEGIN, as mentioned above), the control blocks 602, 604 are created, and the control blocks 602, 604 are linked together (as shown symbolically by link 603). When clients issue requests (via Linkmon) and DIALOG SEND is called), the REQCB block 604 is linked to server class control blocks 606, 608 and 610, as shown symbolically by links 605.

After establishing the links 601, 603 and 605, the request itself is forwarded from the client to the server process by Linkmon. The importance of establishing links is that it sets up a communication path to a server process instance so that path is readily identifiable for work. The presence of links between the objects means the objects will all be readily identified by traversing the links.

In the context-free case, the links 603, 605 would be broken with the REQCB request control block every time a reply is sent back to the client from the server, and thus these links must be reconstructed every time a message is sent, a waste of time and resources. However, in the context-sensitive message, this is not so due to the presence of another object, the Dialog Control Block (DCB) 650. DCB 650 is also responsible for storing the unique file number and/or dialogue ID representing a session to the server.

When a message is received in the present invention, the Linkmon will query a flag in FILE__GETRECEIVEINFO, that is handled by the WriteRead OS, to determine if the message is context sensitive. If the message is not context sensitive, the existing invention can handle the message in the usual, context-free manner (that is, the present invention allows backwards compatibility with existing software). The flag in FILE__GETRECEIVEINFO further contains information as to whether the message is a DIALOG BEGIN, DIALOG SEND, DIALOG ABORT type message.

If, however, the flag in FILE__GETRECEIVEINFO indicates the message is context sensitive, Linkmon also creates the Dialog Control Block (DCB) object 650, which contains information as to the exact nature of the dialogue relationship that exists between the client and the server, and links DCB 650 to the SOCB block 602 and LACB block 608, as shown by symbolic links 607 in FIG. 6. When these two structures SOCB 602 and LACB 608 are linked together by links 607 and the Dialog Control Block 650, it means to the server application that a context-sensitive pathsend session is present. Thus, assuming there is no ABORT or CANCEL, there will be no multiplexing of dialogues in a context-sensitive case, and a sort of temporary dedicated communication between client and server is established. In addition the server knows not to open more than one session, by checking for the presence of a link between the SOCB (Send Open Control Block) and the LACB (Link Access Control Block). All of the above is in reply to Dialog Begin or Dialog Send and in response to the WriteRead OS primitive.

As before, the first part of the protocol is the response by a server to a Dialog Begin or Send. Most of the time the server response is "FeContinue"(which causes a session to be maintained). When an FeContinue is sent, only links 605 are broken (deallocated) between the current request control block REQCB 604 and the control blocks in the server application, and any associated memory is freed. However, the links 607 are not broken, nor is the Dialog Control Block 650 destroyed (deallocated), which contain the information important for maintaining the temporary dedicated communication between server and client. That is, a return code of FeContinue will cause the run-time environment to maintain the connection between the originating process and the receiving process, so that subsequent SERVERCLASS__DIALOG__SEND__requests are routed to the same receiving process instance which is maintaining context relating to the dialogue, in a fast and economic manner.

Likewise, in response to a FeContinue message after a Dialog Begin, the client would pass a Dialog Send and the associated message to Linkmon. Linkmon would look up the dialogue ID received to associate it with the particular dialogue and server (the identification of all dialogues active are present in memory in RAM). Then a request control block REQCB, such as block 604, would be built (allocated) and the links 605 would be established for this particular message.

However, if and when an FeOK error code message is issued by the server and received by the client (via Linkmon), not only are linkages (or bindings) 603 and 605 broken, but also linkages 607 are broken, and furthermore the Dialog Control Block is deallocated and the LACB is marked available. This effectively kills the context sensitive dialogue.

Finally, a DIALOG END will force Linkmon and the operating system to clean up system resources. A DIALOG END can follow a FeOK message.

Of course in the above process the server itself has to know and track the different sessions that are open with different clients, and assign unique Dialog Control Blocks to each. This is particularly true when the server is multi-threaded. In practice, this is done automatically by Tandem's Guardian OS using segments in RAM of the DCB's every time a file is opened, and information in the form of flags relating to the above is passed through to the server along with messages by Linkmon. ID's would also be passed between client and server in the first Dialog Begin and acknowledgement. The uniqueness of ID's is determined by Linkmon working with the operating system (which determines file number id's related to the messages as well). In the preferred embodiment the operating system is the Guardian Tandem operating system (Non-Stop Kernel OS, B30.02 version).

Thus by checking for the presence of links 607, and by traversing the links 607 to read the information present in Dialog Control Block 650, the server application will know whether the next message after a context sensitive Send is from a particular known content sensitive pathsend client application (and most likely that the message will either be a DIALOG SEND or DIALOG ABORT messages, particularly if the transaction is as described in FIG. 2 above). The server will also know that the message is not from some other client application or from a non-context sensitive path send application. This, along with piggybacking of data, saves one or more extra units of computation time and systems resources.

In the present invention as applied to OLTP transactions, every transaction must be atomic, and thus the Tandem operating system that implements the present invention will guarantee every operation after BEGIN TRANSACTION will fail if one does not successfully complete the end of the transaction.

As another example (not illustrated), consider the SQL query that may return as an answer 1000's of rows on the SQL query. Since typically only 32 k of data can be sent (which may only be 100 rows), then multiple sends will be required to send subsequent rows. However these subsequent rows will be sent to the entire class of servers, and the first server receiving the rows will undoubtedly not be the right server. The solution to this problem is to establish a context-sensitive pathsend, analogous to the debit/credit transaction where the same server has to be selected. Thus there would be no need to poll a queue of servers in a server class, as with prior art techniques. Once a context-sensitive session (dialogue) is established and piggy-backing of messages is performed as outlined above, acknowledgement of message with FeContinue by the server will "locked on" a particular client, in a form of temporary dedicated or pseudo-synchronous communication. Likewise piggyback communications may be used to tear down (kill) the dialogue.

Further, one skilled in the art will appreciate that any software instructions used to implement the invention described herein (code), data, data structures and any computer hardware incorporating the same form an integrated whole, together with any other similar structures in the network system, to form the present invention.

The foregoing description is offered for illustrative purposes only. Numerous modifications and variations may be readily apparent to those skilled in the art, while still falling within the spirit and scope of the invention as claimed herein below.

What is claimed is:

1. A method for sending information between a client and a server, the method comprising the steps, performed by a data processing system, of:
   sending, by the client, an initial request including data relating to the initial request and data relating to the state of a client-server relationship;
   establishing a dialog between the client and server, by an operating system of the data processing system, in response to the initial request;
   sending, by the server, a response to the initial request, the response including data relating to the initial request and a dialog status relating to the state of the client-server relationship; and
   sending, by the client, in accordance with a value of the dialog status, a second request.

2. The method of claim 1, wherein the step of establishing a dialog includes the step of establishing a dialog ID.

3. The method of claim 2, wherein the second request includes the dialog ID.

4. The method of claim 2, wherein the step of establishing a dialog ID includes the steps of associating the dialog ID with the initial request and sending the initial request to the server.

5. The method of claim 1, wherein the dialog status has one of the following values:
   FeOK, which indicates that the dialog should be ended, and
   FeContinue, which indicates that the client should send another request.

6. The method of claim 5, wherein the second request is sent by the client when the value of the dialog status is FeContinue, which indicates that the server has additional information to send.

7. The method of claim 1, further comprising the step of sending, by the server, a second response, which contains information logically related to information in the response by the server to the initial request.

8. The method of claim 1, further comprising the step of:
   sending, by the client, an abort message that ends the dialog.

9. The method of claim 1, further comprising the step of:
   sending, by the server, an abort message that ends the dialog.

10. The method of claim 1, further comprising the step of:
    sending, by the operating system, an abort message that ends the dialog.

11. The method of claim 1, wherein the step of establishing a dialog includes the step of setting up a dialog control block that includes a dialog ID.

12. The method of claim 1, wherein the initial request includes a field indicating that a context sensitive dialog should be established.

13. The method of claim 1, further comprising the step of:
    sending, by the client, a dialog end message when the dialog status is FeOK.

14. The method of claim 1, wherein the step of establishing a dialog further includes:
    querying a flag, by the operating system of the data processing system, in response to the initial request, wherein the flag indicates whether a dialog is context sensitive; and
    creating a dialog control block if the flag indicates that the dialog is context sensitive, wherein the dialog control block contains information related to the client-server relationship, and wherein the dialog control block is linked to a send open control block and a link access control block in order to maintain the dialog.

15. An on-line transaction processing apparatus, comprising:
    a client, including:
      means for sending an initial request including data relating to the initial request and data relating to the state of the client-server relationship,
      means for sending, in accordance with a first value of a dialog status relating to the state of the client-server relationship, a second request, and
      means for sending, in accordance with a second value of the dialog status, a dialog end message;
    a server, including:
      means for sending a first response to the initial request, the first response including data relating to the initial reguest and the dialog status having the first value, and
      means for sending a second response to the second request, the second response including information logically related to information in the first response and the dialog status having the second value; and
    means for establishing a dialog between the client and the server, in response to the initial request.

16. The apparatus of claim 15, wherein the first and second dialog status values, respectively, are FeContinue and FeOK, respectively indicating that the client should send another request and that the dialog should be ended.

17. A client in a network system including the client and at least one server, comprising:
    first sending circuitry provided to send an initial request to the server, the initial request including data relating to the initial request and data relating to the state of the client-server relationship;
    receiving circuitry provided to receive a dialog status relating to the state of the client-server relationship from the server; and
    second sending circuitry provided to send to the server, in accordance with a value of the dialog status, one of 1) a second request to the server, where the second request is logically related to the first request and 2) a dialog end message.

18. A server in a network system including the server and at least one client, comprising:

first receiving circuitry provided to receive an initial request from the client, the initial request including data relating to the initial request and data relating to the state of the client-server relationship;

first sending circuitry provided to send first data to the client in response to the initial request, the first data including data relating to the initial request and a dialog status value indicating that the server has more data to send in response to the initial request;

second receiving circuitry provided to receive a second request from the client; and second sending circuitry provided to send second data to the client in response to the second request, the second data including a dialog status value indicating that the server has finished sending its data.

19. The server of claim 18, wherein the first and second data are logically related.

* * * * *